April 5, 1960 L. B. WING 2,931,412
CORRUGATED SPRING STEEL BUSHING
Filed Oct. 14, 1954 3 Sheets-Sheet 1
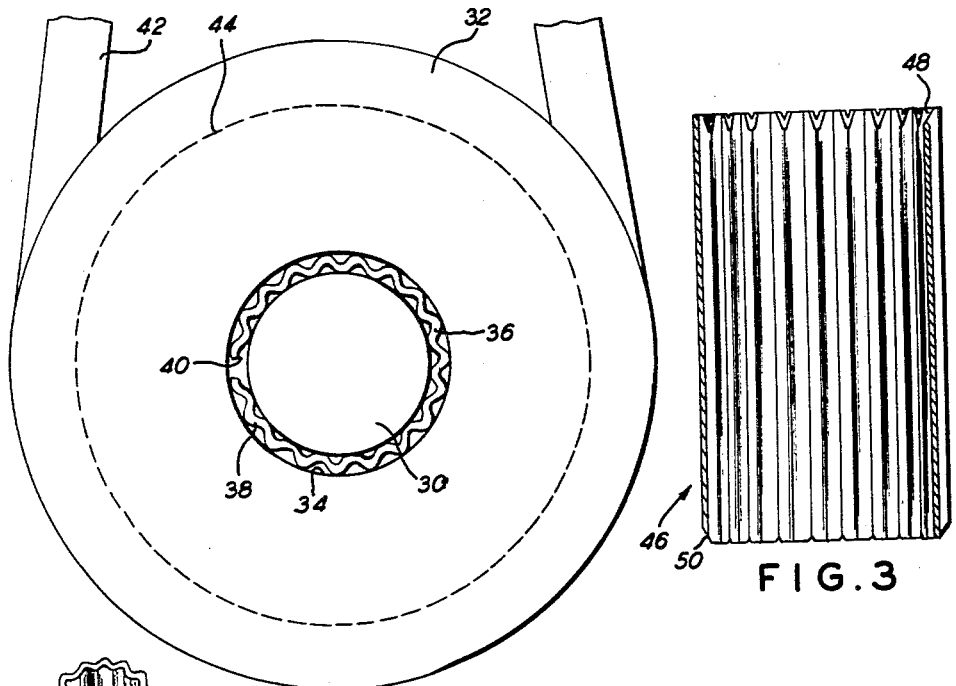
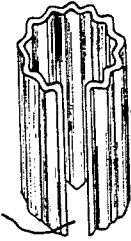
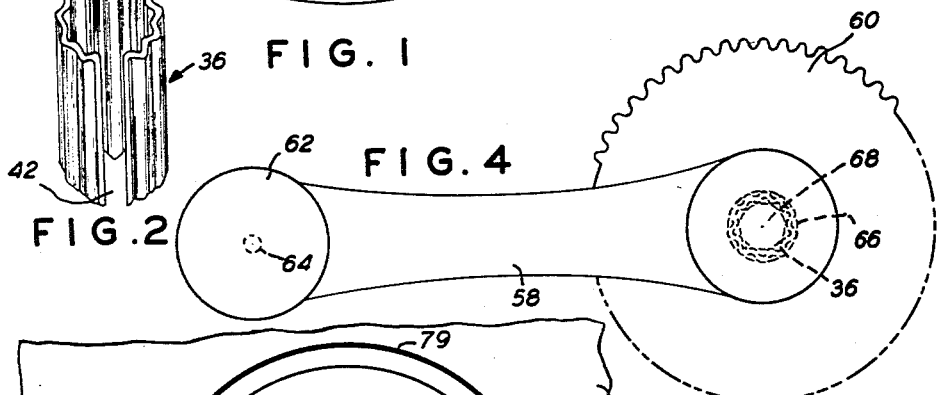
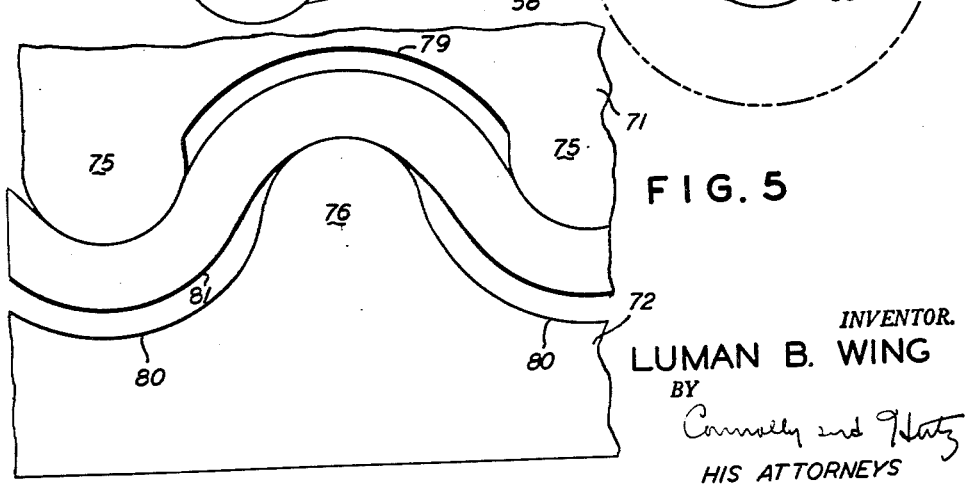
INVENTOR.
LUMAN B. WING
BY
HIS ATTORNEYS April 5, 1960  L. B. WING  2,931,412
CORRUGATED SPRING STEEL BUSHING
Filed Oct. 14, 1954  3 Sheets-Sheet 2

INVENTOR.
LUMAN B. WING
BY
HIS ATTORNEYS

April 5, 1960 L. B. WING 2,931,412
CORRUGATED SPRING STEEL BUSHING
Filed Oct. 14, 1954 3 Sheets-Sheet 3
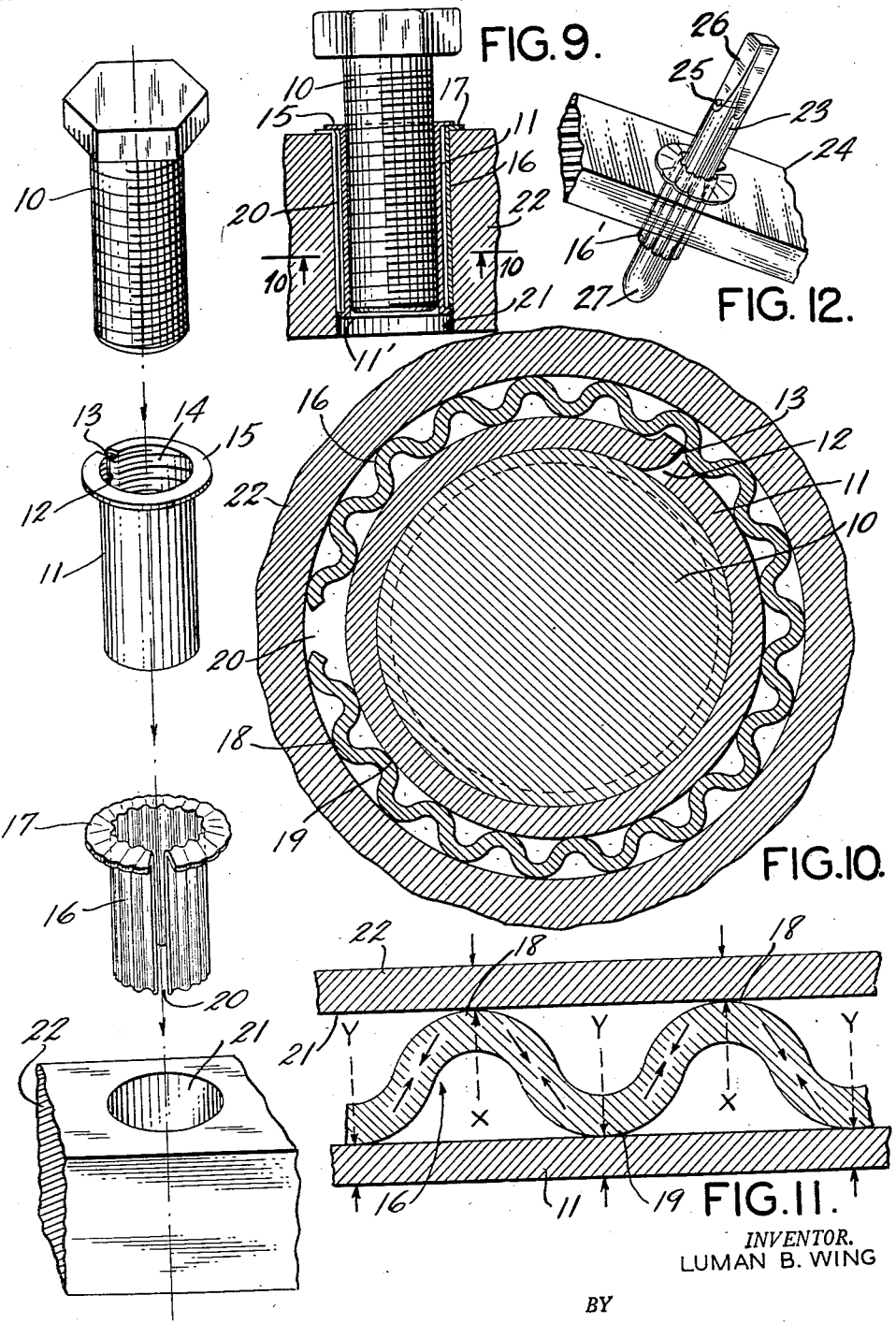
INVENTOR.
LUMAN B. WING
BY
ATTORNEYS

United States Patent Office 2,931,412
Patented Apr. 5, 1960

2,931,412

CORRUGATED SPRING STEEL BUSHING

Luman B. Wing, Islip, N.Y.

Application October 14, 1954, Serial No. 462,257

10 Claims. (Cl. 151—41.7)

This invention relates to fastening devices and has particular reference to such a device in which a bushing frictionally locks a shaft, rod, pin, screw, stud or bolt in an opening against unintended movement with respect to the opening.

In accordance with the present invention, there is provided such fastening devices which do not require the opening to be threaded or otherwise specially treated, which so strongly resist movement in the opening as to be capable of directly transmitting several horsepower of mechanical motion, and which may be readily released and reused many times notwithstanding the positive locking.

Such a device is only possible by using spring steel or equivalent material, so hardened that it can only be elastically deformed under such pressure as it is subjected to in this device.

It is impossible to accomplish the purpose of this device, which is to resist and or transmit torque, with plastically deformable materials such as aluminum sheet iron, because such plastically deformable materials will yield to the torque and be deformed by it, and thus release whatever grip they had in direct proportion to the stress that is applied.

With elastic deformation of hardened spring steel, as used exclusively and for the first time in this invention, there is no permanent change in shape when pressure is applied and released or under the stress of torque.

The above as well as additional advantages of the present invention will be more clearly understood from the following description of several of its exemplifications, reference being made to the accompanying drawings wherein:

Fig. 1 is an elevation of a pulley drive connection according to the present invention;

Fig. 2 is a perspective view of a bushing of the present invention used in the construction of Fig. 1;

Fig. 3 is a vertical sectional view showing chambered ends of bushing embodying the present invention;

Figs. 4, 6 and 7 show different forms of drive connections exemplifying the present invention;

Fig. 5 is a schematic drawing of one way to make the bushing of the present invention;

Fig. 8 is an exploded view of a further embodiment of the present invention including a threaded stud, a tubular sleeve, a corrugated spring locking bushing, and a bar having a circular hole for receiving the bushing;

Fig. 9 is an axial section through the assembly of the parts shown in Fig. 8;

Fig. 10 is a transverse section through the aforementioned assembly as seen along lines 10—10 of Fig. 9, but greatly enlarged.

Fig. 11 is a further enlarged fragmentary view of a section of Figs. 8 and 9 indicating the stresses in the spring bushing when in use;

Fig. 12 is a perspective view of a tapered pin driven through the spring locking bushing of this invention when used in a different environment, such as the frame of a piano in which the pin is the tuning key.

Figure 6:
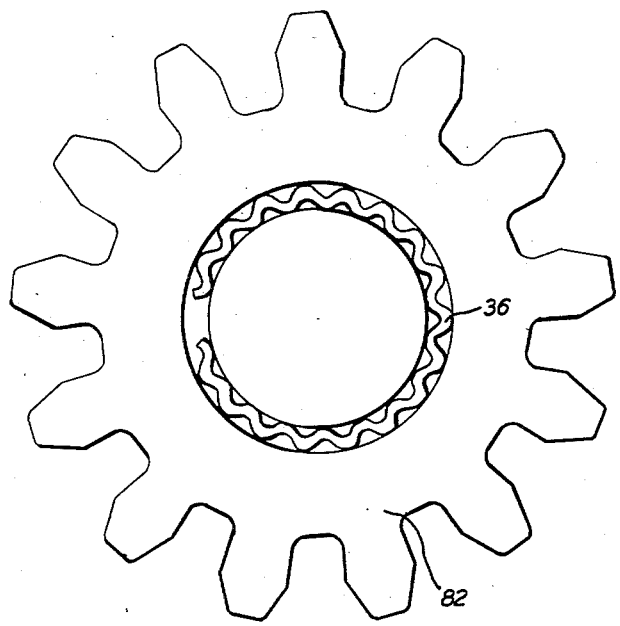

It has been discovered that a very effective form of frictionally locked fastening can be provided by a substantially rigid metal wall with an untapped round hole, a substantially rigid metal member having an unthreaded external surface corresponding to but somewhat smaller than the hole, and a tubular hardened sheet spring steel bushing having axially directed substantially sinusoidal corrugations with radially compressible rounded outer and inner ridges encompassing the metal member and jammed between it and the side walls of the hole, the outer ridges being spaced apart a distance not greater than 10 times the thickness of the sheet steel, and the jamming compressing the corrugations to frictionally lock the metal member in place.

By substantially sinusoidal corrugations is meant convolutions in which there are outer ridges, inner ridges and webs interconnecting the ridges, the webs extending in directions having definite peripheral components with respect to the tube defined by the bushing, that is, not approaching the tube's radials by less than about 15 degrees, and preferably not less than 30 degrees. The inner radii of both outer and inner ridges are preferably about the same as thickness of metal and not greater than 2 times the thickness of metal. The webs interconnecting the ridges are preferably not longer than the thickness of metal and not longer than 2 times the thickness of metal.

The dimensions stated above and elsewhere in application constitute not matters of choice but definite limiting specifications designed to define a new spring structure with exceedingly high radial load capacity. It is easily understood, that an arc whose radius approximates the thickness of metal of which the arc is formed, has per se a very high load capacity. Likewise, it is easily understood, that the webs, between adjoining arcs on opposite sides, which constitute struts in compression, are extremely stable in equilibrium when their ratio of length over thickness is very small. This is clearly shown in correct proportions in Fig. 11 where the ratio is less than 1 over 1. This Fig. 11 is a reproduction of Fig. 3 in application filed May 4, 1951.

Referring now to Fig. 1, there is here shown a pulley drive assembly such as would be used with an automobile-type electric current generator. At 30 is shown the rotatable shaft for such generator as it projects from the generator housing itself. Within the generator housing (not shown) this shaft generally carries the armature windings, the shaft being driven by a connection made externally of the housing. A pulley 32 having a central opening 34 of somewhat greater diameter than the shaft, has this opening fitted over the protruding portion of the shaft. In the space 40, between the shaft and inner walls of the opening 34, there is interposed a generally tubular bushing 36 made of corrugated and hardened sheet spring steel with the corrugations 38 in generally sinusoidal form and directed axially of the bushing. The bushing is arranged so that its corrugations project radially of the pulley a distance greater than the space 40 so that the bushing has to be forced into place and the corrugations compressed by such mounting.

The pulley is driven by any convenient means such as a pulley belt 42 that is received in a peripheral groove 44 in the pulley. By having the bushing made of type 1070 spring steel fully hardened with a wall thickness of 13 thousandths of an inch, an overall or radial thickness of 35 thousandths of an inch from the outer ridges to the inner ridges, and with the outer ridges spaced 60 thousandths of an inch apart, the structure of Fig. 1 will transmit without slipping sufficient power to operate a 400 watt automobile-type generator at full capacity.

Best frictional locking results are obtained when the bushing is compressed in the mounting so that its overall thickness from the outer ridges to the inner ridges is squeezed down by at least 5 to 10 thousandths of an inch. When the ratio of the space between outer ridges (corrugation length) to the metal thickness is greater than 10, the frictional forces are of sharply reduced magnitude. It is also preferred to have the ridges of the corrugations rounded with a radius approximating the thickness of the sheet metal itself, and not more than about twice this thickness. By reason of the sinusoidal shape, the radial thickness of the bushing will usually be between about 2 and 4 times the sheet metal thickness.

Fig. 2 shows the corrugated bushing 36 before it is inserted in the assembly of Fig. 1 for example. The bushing is grooved into the form of a slit tube having a gap 42 between the split edges. Although it can be used in accordance with the present invention even though it does not have a gap, the presence of a gap facilitates its use. Without the gap, that is where the bushing is made in seamless or welded-together form, the bushing must be more accurately shaped to properly fit into the intended space. With the slit construction, the radius of the tube can be varied considerably inasmuch as the mounting of the tube will cause it to open or close somewhat and accommodate it in the space provided. To this end, the slit form preferably has a slit spacing 42 of appreciable magnitude of at least 1 or 2 corrugation lengths. This also helps in the mounting because it keeps the edges of the slit from being inadvertently overlapped during the mounting. Since the bushing is tightly squeezed into place, it is just about impossible to force it in the allowed space when there is such an overlap.

The assembling operation is easily carried out by merely partially inserting the bushing in the hole of pulley 32, then placing the pulley and bushing combination over the end of the shaft 30 with the uninserted portion of the bushing spread somewhat to fit over the shaft end. The shaft and bushing can then be pressed into the hole in the pulley. The bushing being somewhat yieldable acts somewhat like a shoe horn to guide the parts together. If it is desired to simplify the assembling, the bushing can have either or both ends chamfered.

In Fig. 3 there is shown a bushing 46 according to the present invention having one end chamfered at its inner edge 48, and the other end chamfered at its outer edge 50. This type of bushing is readily forced into place either by first placing it in the pulley or other socket, and then pressing the shaft into the bushing, or vice versa. However, the bushing should be oriented so that the chamfer makes a tapered wedging surface for the assembling. In other words where the shaft is pressed into the bushing held in that pulley, the chamfered edge 48 is the one in which the shaft enters. Conversely where the pulley is pressed on last, it is pressed over chamfer 50.

The bushing of Fig. 3 accordingly has somewhat more versatility of application. If this versatility is not needed, as for example when bushings are used in a specific installation, only the wedging edge need be chamfered. For some purpose, it is desirable to have identical chamfers at both bushing ends, to thereby make it unnecessary to orient the bushing and accordingly speed the assembling step. However, a chamfer at the rear or nonwedging end sometimes makes the wedging too awkward by reason of the difficulty in properly applying the required pressing forces to the thin edge the chamfer leaves. However, with mountings in blind sockets or the like the extra chamfer at the blind socket wall usually gives no trouble. Bushings without chamfers can also be used but are somewhat awkward to initiate the wedging action with.

For the purposes of the present invention the pulley 32 and shaft 30 should be of substantially rigid construction so that they are not appreciably indented or scored by the ridges of the bushing. Such indentation does not permit the proper squeezing of the bushings' radial thickness to develop the desired compressive forces. Furthermore, the indenting indicates that the indented surfaces are too soft and in such combinations the indentations generally become progressively deeper with use so that the spring forces are even further reduced. With ridges having contacting surfaces with a radius of about 10 thousandths of an inch or more, ordinary low carbon steels such as SAE 1010 form satisfactory mating surfaces, particularly if they are somewhat work-hardened. Other materials such as brass or bronze of similar hardness can also be used. Where the mating surfaces are too soft, they can be protected by liners of harder material such as spring steel shim stock. Such liners can be separately inserted, or can be made integral with the members that they protect.

Fig. 4 shows an automobile type window operating handle. This has a sturdy arm 58 to one end of which is rigidly secured an operating gear 60 suitably supported for rotation about its axis. On the other end of the arm 58 is a knob 62 which is usually pivotally held as by a rivet 64 so that it can rotate with respect to the arm. According to the present invention, the gear 60 is fastened to arm 58 with a bushing 36 as in Fig. 2. For this purpose the arm 58 has a blind socket 66 into which the bushing can be dropped after which the gear shaft 68 is pressed into the bushing. As with the construction of Fig. 1, the parts held together by the bushing can be fairly readily separated by merely pulling them apart with sufficient force. As much as 100 pounds or more is sometimes necessary to accomplish this. After the parts have been disassembled, they can again be reassembled and the disassembly and reassembly repeated many times without showing any indication that the parts are wearing down or that the bushing is weakening.

Fig. 5 shows a step in one technique for making the bushings of the present invention. Two complementary die gears 71, 72 are provided with upstanding teeth or ribs 75, 76, whose outer surfaces have a radius of curvature slightly smaller, about 5%, than the desired internal ridge radii in the finished product. Between the ribs 75 and 76 the mating die surfaces are relieved as indicated at 79 and 80. The gears 71, 72 are arranged for rotation in the meshed condition illustrated. A sheet 81 of unhardened spring steel is fed into the nip of the gears, which are then rotated so that the successively meshing teeth deform the corresponding portion of the sheet in the manner shown in Fig. 5. The rotating axes of the gears are adjusted so that the teeth bend the metal about 10% more than desired in the final product. When the metal emerges from between the gears, it will have the desired corrugations and can then be bent around a mandrel somewhat smaller than the desired internal size of the completed bushing. The shaped product can now be hardened in the conventional manner.

It is desirable when bending the corrugated metal into tubular form, to distribute the bending pressure as by using a bending tool that follows the contours of the corrugation. A grooved metal bending tool can be used for this purpose, or if desired, a yieldable tool such as one of leather that will deform itself into the shape of the corrugation.

The chamfering can be very conveniently effected at the same time as the corrugating. For example by merely having the side edges of the sheet 81 contact suitably positioned grinding wheels as it emerges from between the corrugating gears, the appropriate corner of the side edge can be readily ground off. The chamfering can also be accomplished by the use of a conical grind stone applied to the ends of the bushing after it is bent into tubular form.

Fig. 6 shows a drive construction similar to that of Fig. 1 except that a gear 82 takes the place of pulley 32.

The operation of the gear assembly is just as satisfactory as that of the pulley assembly.

Figure 7:
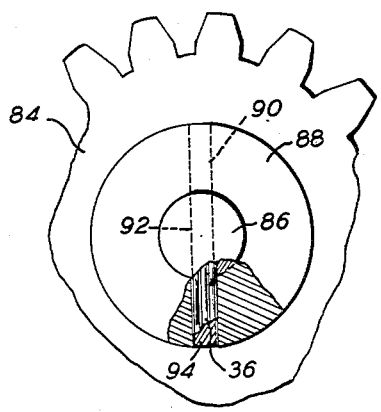

Instead of using the bushing of the present invention for transmitting motion in a circular direction around the bushings tubular axis, they can also be used to transmit such motion around a transverse axis or in other directions. In Fig. 7 a bushing 36 is fitted like a driving pin between a gear 84 and a shaft 86. A hub 88 is provided on this gear and has a drilled transverse passageway 90. A similar transverse passageway 92 is drilled through the shaft so that when assembled these passageways can be aligned, as shown. The bushing 36 can then be inserted and a backing pin 94 jammed into the tubular space within the bushing. If desired, however, the bushing can first be slipped over the backing pin and both together forced into the aligned passageways. A bushing of sheet metal 9 thousandths of an inch thick, overall radial thickness of 30 thousandths of an inch, corrugation length 42 thousandths of an inch and wedged in a space that provides a radial clearance of 24 thousandths of an inch, makes a very effective driving pin construction with passageways having a ¼ inch diameter.

Fig. 8 shows a modification of the invention in which a liner is used so as to protect a threaded surface that is frictionally held by the bushing. In this figure, numeral 10 designates a threaded stud, numeral 11 the liner or sleeve which is slotted axially at 12 and is provided with an axial key 13 shown in enlarged section in Fig. 10. The bearing sleeve 11 preferably is formed of brass or other good bearing material, and may be internally threaded to threadedly engage the threads of the stud 10. The internal threads 14 in the bearing sleeve 11 may be tapered from top to bottom to facilitate the threading of the stud into place.

The bearing sleeve 11 is adapted to fit within the locking bushing 16 which in this form is shown as provided with a stop flange 17 at one end. The flange makes it somewhat easier to force the bushing 16 into place, and can be provided by suitably bending over the end of the bushing before it is hardened. A slit 20 in the bushing not only provides the adjustment tolerance referred to above, but simplifies the bending over of the flange.

The spring bushing 16 is adapted to be inserted in a hole 21 which is not threaded or otherwise specially prepared for its reception, and the hole 21 may be drilled in a bar 22 or other member to which the screw 10 is adapted to be locked against turning. It will be understood that the part 22 may be an unthreaded nut, crank, lever, plate or the like, to which another part is adapted to be fastened by stud 10, tap screw, or the like.

In assembling the parts, the locking bushing can first be inserted in the hole 21, after which the bearing sleeve 11 is inserted within the bushing 16 with the flange 13 entering one of the inner grooves formed by the corrugations of the locking sleeve 16 in the manner shown in Fig. 10 so as to keep the bearing sleeve 11 from rotating relatively to the locking bushing 16 as is indicated in Fig. 10. The tap screw 10 is then screwed into bearing sleeve 11 which, as stated, may or may not be internally threaded at 14. In the event that it is not threaded, the tap screw 10 cuts threads in the interior surface of bearing sleeve 11.

The bushing 16 and bearing sleeve 11 may be permanently mounted on part 22 by spinning over the free end of bearing sleeve 11 as shown at 11', for instance, so that stud or tap screw 10 can be simply screwed therein and can be unscrewed. Alternatively, the free end 11' of the bearing sleeve is simply spun over the corresponding end of the bushing 16 without extending beyond the outer diameter thereof, so that the locking bushing 16 and the sleeve 11 become a more easily handled unit to which the screw or stud 10 may be added.

The dimensions of the various parts constituting the assembly shown in Fig. 9 may be, for example, a wall thickness of .015 inch for the sheet metal of the locking bushing 16, a corrugation length of .080 inch between the ridges 18, an overall radial thickness of .040 inch; the bearing sleeve 11 can have a wall thickness of .031 inch.

With the parts assembled but before inserting the stud 10, the internal diameter of the bearing sleeve 11 is slightly less than the diameter of the stud and the inner diameter of the locking bushing 16 is slightly less than the outer diameter of the bearing sleeve 11, while the outer diameter of the locking bushing 16 is approximately equal to the diameter of the hole 21, so that as it is screwed into the bearing sleeve 11, the latter expands radially so as to press the spring locking bushing 16 against the inner surface of the hole 21 in the part 22.

Referring to Fig. 11 the opposing pressures in the construction of Fig. 9, as well as of Figs. 1, 4, 6 and 7, are indicated by the solid arrows on the strips representing the part 22 and the bearing sleeve 11. These compression forces are resisted by the external ridges 18, as indicated by the dotted arrows X, and by inner ridges 19, to provide the aforementioned high degree of friction.

Because of the resiliency of the spring locking bushing 16, the outward pressures X at each of the outer ridges 18 is equalized circumferentially of the bushing 16. Likewise, the inward pressures Y are equalized throughout the inner circumference of the bushing 16. Notwithstanding the rigid lock afforded by the spring locking bushing 16 between the stud or tap screw 10 and the part 22, no element of the assembly is permanently deformed. Accordingly, by the exertion of sufficient force, the stud 10 may be unscrewed from bearing sleeve 11 and, as the pressure on spring locking bushing 16 is relieved by removal of the stud, the corrugations of the bushing 16 are restored to their normal unstressed shape and the spring bushing 16 is ready for reuse virtually innumerable times.

The bearing sleeve 11 is preferred for use where threaded screws such as stud 10 are to be driven into the work 22, so as to minimize deformation or marring of the screw's threads by rotation directly against the hardened steel locking bushing 16. However, the bearing sleeve 11 may be omitted in the case of an unthreaded bolt, pin, or the like, which is simply driven directly into the locking bushing 16. Furthermore, the bolt or pin can be tapered, in which event it can be used as a wedge to compress the bushing 16.

An example of the tapered construction is illustrated in Fig. 12 where the pin 23 is slightly tapered, and is driven directly into the locking bushing 16' which in turn is inserted in an unthreaded or drilled hole in the bar 24. In the drawing the bar is represented as though it were transparent to illustrate the relative positions of the parts.

The gripping effect of the locking sleeve 16' on both the hole in the bar 24 and on the surface of the pin 23 is the same as is illustrated in Figs. 1 and 7, and precludes inadvertent rotation of the pin 23. The cylindrical shank of the pin 23 or a bolt, as the case may be, is therefore securely held in place. The locking bushing 16' is useful in holding piano string anchoring and adjusting pins in tuning adjustment. For this type of use the pin is provided with a transverse passageway 25 into which the end of a piano string can be placed, and the string then wound around the adjacent portion of the pin to keep the inserted end from pulling out. The pin 23, however, may be rotated around its axis by applying sufficient torque. With the bushing of the type described in connection with Figs. 8 and 9, a radial compression of 3 thousandths of an inch will usually call for about 40 foot pounds of torque, whereas the standard types of piano tuning pins can be turned with as little as 5 foot pounds. Flats 26 on the pin enable the application of the torque by a tool having a socket shaped to fit the head of the pin.

The taper of pin 23 is shown at 27 the balance of the pin being untapered. In this way the wedging penetration is only supplied when the entering end of the pin is inserted in the bushing. When the pin is fully seated as shown in Fig. 12, there will accordingly be no tendency for the pin to be squeezed out of the bushing, particularly while the pin is being rotated for a tuning adjustment.

The members held together in accordance with the present invention should be capable of resisting the relatively large compressive and expansive forces that are applied to the inner and outer bushing-containing structures. Masonry members such as stone, concrete or the like are hopelessly incapable of withstanding the expansive forces. Such members are furthermore readily indented by the concentrated expansive or compressive forces and crumble away too readily. Metal structures are the only ones that have been so far found to make suitable bushing-contacting surfaces.

Where the members are required to be rotated with respect to each other, their surface hardness should be higher than the minimum for devices in which there is no relative rotation. Furthermore, if the relative rotation is directed to be accurately settable as in the tuning pins of Fig. 12, the surface hardness should be still higher.

Depending on the shape of the associated members, the spring locking bushing may have various shapes, such as axially tapering, oval in cross-section, or the like, although in most cases it will be of substantially uniform diameter and circular in section, as shown.

Fastening structures of the present invention have a great many uses in addition to those referred to above. They can, for example, make excellent self-locking nuts that exceed the high commercial standards. For this type of operation a construction similar to that shown in Fig. 9 is very suitable although better results are obtained if the nut is arranged so that it is threaded onto the bolt from the opposite end. In other words, the flanges 15 and 17 are desirably located so that they make it impossible for the bushing or sleeve to be pulled into the hole 21 by the tension under which the nut has to be applied.

Self-locking nuts of this type are easier to use if the corrugations of the bushing are tapered so that the nut is more readily started on the screw, and the frictionally held forces are greatly increased in magnitude. In fact, the taper can be arranged so that the bushing does not even begin to be compressed until after the screw has been partially threaded into the nut. A total taper of about 5 thousandths of an inch in corrugation height is all that is needed for the conventional bolts, and is easily provided by merely tilting the axes of the corrugating gears (see Fig. 5) with respect to each other.

Instead of, or in addition to tapering the corrugation, the sleeve 11 can have its thickness tapered in an axial direction. Such a tapered sleeve is made, for example, from a sleeve of uniform wall thickness by internally threading it with a straight tap while it is held in a tapered hole in a jig.

As pointed out above, the liner or liners used with self-locking nuts or other fastening devices of this invention are desirably fitted with flanges, as shown at 13 in Fig. 10, to keep them from rotating during the assembly operation before sufficient frictional torque resistance is developed. Instead of having such a flange small enough to be received in a corrugation, as indicated in Fig. 10, the flange can be moved to the gap 20 where the bushing is axially slit. This permits the use of a somewhat longer rotation-preventing flange.

A feature of the present invention is that it provides a fastening structure which not only has an unusually high torque resistance, but which also provides automatic torque limiting. In other words, with the drive constructions of Fig. 1 or 6, the fastenings can be arranged to prevent relative rotation for all torque conditions to which the apparatus is normally subjected. Should something unforeseen cause a greater amount of torque to be applied, then the frictional forces will automatically permit slippage to take place so that these forces will not be transmitted through the drive connection. This aspect of the invention makes it ideally suited for such use as marine propeller drive shafts, specially for outboard motors, where in use the rapidly rotating propeller is apt to suddenly strike stationary objects such as driftwood. Where the prior art uses shear pins for this purpose, the drive connections of the present invention have no need for such additional expensive safeguards that have to be serviced and frequently replaced. Even if the drive connections of the present invention slip to accommodate unusual torque, no maintenance whatsoever is needed. As soon as the unusual torque condition is ended, the normal torque transmission is automatically reinstated.

For use in such marine drives it is advisable to have the bushing made of some metal that does not corrode readily with salt water. A suitable metal for this purpose would be nickel-steel alloys such as chromium-nickel stainless steels and the like.

Bushings made of sheet metal having thicknesses of up to about 15 thousandths of an inch give best results when the overall radial thickness of their corrugated walls is less than 5 times the wall thickness.

This application is in part a continuation of co-pending application Serial No. 224,630 filed May 4, 1954.

As many apparently widely different embodiments of this invention may be made without departing from the spirit and scope hereof, it is to be understood that this invention is not limited to the specific embodiments hereof except as described in the appended claims.

The appended claims are all for one species with one object and attain one and the same result using various flanges, sleeves, etc. which do not alter any of the above but simply facilitate use of device in different applications, as is explained in description.

What is claimed is:

1. In combination, a rigid metal member having a round hole, a round rigid metal rod extending into said hole, and a bushing between said rod and the wall of said hole, said bushing holding said round rigid metal rod in said round hole in rigid metal member, said bushing being a tube of hardened sheet spring steel, hardened to a spring temper, having axially directed substantially sinusoidal corrugations extending around it and effectively increasing its original overall radial thickness to 2 to 4 times the thickness of the sheet steel, the outer ridges of the corrugations being spaced apart a distance less than 10 times the thickness of the sheet steel, and the outer and inner ridges, whose inner radii approximate the thickness of sheet steel and are not greater than 2 times the thickness of sheet steel, and whose webs between inner and outer ridges approximate in length the thickness of sheet steel and are not longer than 2 times the thickness of sheet steel, being rounded to provide spring arcs radially compressible between the walls of hole and the surface of round member to frictionally lock the round member in hole for torque resistance and transmission said bushing being elastically compressed between round member and hole to reduce its original radial thickness by at least one seventh.

2. The invention of claim 1 in which the spring bushing is longitudinally slit.

3. The invention of claim 2 in which the crowns of corrugations are chamfered at the ends.

4. The invention of claim 2 in which one end of spring bushing has a transverse flange.

5. The invention of claim 4 in which a slit sleeve with transverse flange of bearing metal is placed between spring bushing and round member.

6. The invention of claim 5 in which slit sleeve is threaded and is placed between spring bushing and threaded round member.

7. The invention of claim 6 in which a threaded slit sleeve with axial flange is placed between spring bushing and threaded round member.

8. The invention of claim 7 in which the threaded slit sleeve is of tapered radial thickness.

9. The invention of claim 2 in which the round rigid member is a shaft and the round hole is the axis of impeller, pulley or gear.

10. The invention of claim 2 in which the round rigid member is an untapered pin and the round hole is an untapered hole transversely through hub and shaft of impeller, pulley or gear.

References Cited in the file of this patent

UNITED STATES PATENTS

| | | |
|---|---|---|
| 862,898 | Forsyth | Aug. 13, 1907 |
| 1,469,880 | Bowden | Oct. 9, 1923 |
| 2,239,641 | Bierend | Apr. 22, 1941 |
| 2,399,107 | Eckenbeck et al. | Apr. 23, 1946 |
| 2,481,325 | Miller | Sept. 6, 1949 |

FOREIGN PATENTS

| | | |
|---|---|---|
| 265,879 | Germany | July 27, 1912 |
| 414,631 | Great Britain | May 1, 1933 |
| 636,346 | Great Britain | Apr. 26, 1950 |
| 1,031,916 | France | June 29, 1953 |